United States Patent [19]

Hager et al.

[11] Patent Number: 5,538,258
[45] Date of Patent: Jul. 23, 1996

[54] OIL SEAL FOR A HIGH SPEED ROTATING SHAFT

[75] Inventors: Jonathan S. Hager; Kellan P. Geck, both of Chandler; William L. Giesler, Phoenix; Gary A. Farnsworth, Mesa, all of Ariz.

[73] Assignee: AlliedSignal Inc., Morris Township, N.J.

[21] Appl. No.: 391,847

[22] Filed: Feb. 22, 1995

[51] Int. Cl.⁶ .................................................. F16J 15/447
[52] U.S. Cl. ............................. 277/18; 277/57; 277/67; 277/68; 277/133
[58] Field of Search .......................... 277/13, 14 R, 277/18, 55, 56, 57, 134, 215, 84, 67, 68, 133; 384/135, 478, 480

[56] References Cited

U.S. PATENT DOCUMENTS

| 1,779,076 | 10/1930 | Ray . | |
| 1,905,234 | 4/1933 | Labberton . | |
| 2,202,944 | 6/1940 | Boyd . | |
| 2,524,124 | 10/1950 | Gyana | 277/67 |
| 2,886,351 | 5/1959 | Heard | 277/53 |
| 3,096,985 | 7/1963 | Biheller . | |
| 5,024,451 | 6/1991 | Borowski | 277/57 |
| 5,431,414 | 7/1995 | Fedorovih et al. | 277/53 |

FOREIGN PATENT DOCUMENTS

| 493756 | 2/1930 | Germany | 277/57 |
| 1513275 | 10/1989 | Russian Federation | 277/53 |
| 1520283 | 11/1989 | Russian Federation | 277/53 |
| 24570 | 11/1904 | United Kingdom | 277/53 |
| 2035472 | 6/1980 | United Kingdom | 277/57 |

*Primary Examiner*—Scott W. Cummings
*Attorney, Agent, or Firm*—Jerry J. Holden; James W. McFarland

[57] ABSTRACT

An improved oil seal is provided for sealing passage of rotatable shaft through an end wall of a bearing housing in a turbomachine or the like, wherein the shaft is rotatably supported within the bearing housing by oil-lubricated bearings. The improved oil seal comprises a slinger rotor mounted on the shaft for rotation therewith. The slinger rotor includes a radially outwardly extending slinger ring with radially open slinger ports formed therein, in combination with an axially projecting centrifuge sleeve defining an internal tapered centrifuge surface disposed in close running clearance with an axially projecting cylindrical wall segment on the end wall. During shaft rotation, the centrifuge surface pumps oil in a direction away from the end wall to the slinger ring for discharge through the slinger ports to the interior of the bearing housing. In addition, in the preferred form, the slinger rotor has an internal bore with axially extending lands for press-fit mounting onto the rotating shaft, wherein the lands are separated by ramped slots defining additional tapered centrifuge surfaces for pumping oil away from the end wall of the bearing housing.

9 Claims, 1 Drawing Sheet

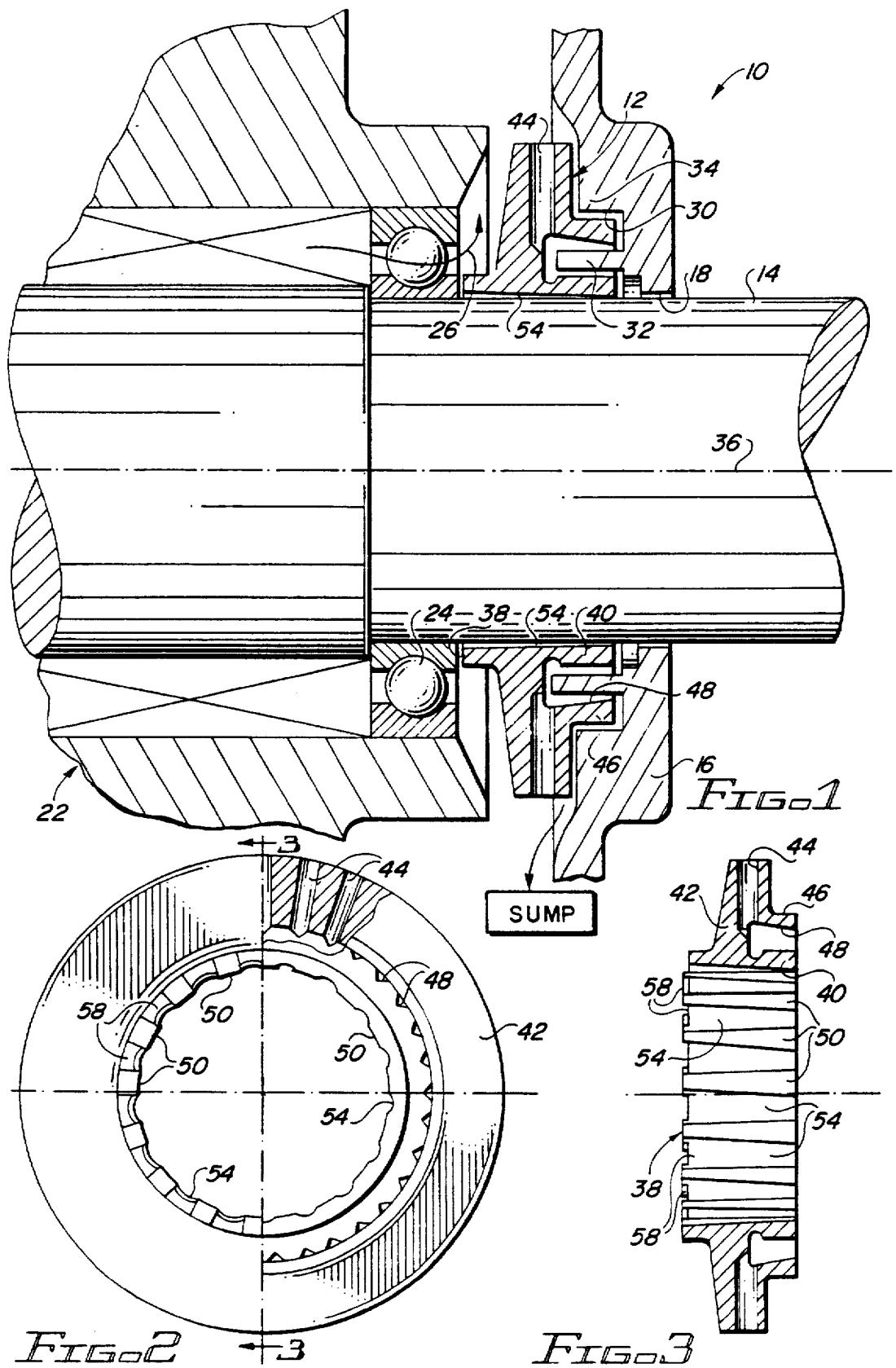

# 5,538,258

OIL SEAL FOR A HIGH SPEED ROTATING SHAFT

BACKGROUND OF THE INVENTION

This invention relates generally to improvements in oil seals and related seal systems for preventing oil leakage in connection with rotating shafts, and particularly in connection with relatively high speed rotating shafts in turbomachines and the like. More specifically, this invention relates to an improved oil seal utilizing principles of dynamic air-oil separation to seal passage of a rotatable shaft through an end wall of a bearing housing.

In turbomachinery, a rotatable shaft is commonly supported by appropriate journal and thrust bearings mounted within a bearing housing, wherein oil is circulated from a sump to lubricate the bearings. The rotatable shaft extends through an end wall of the bearing housing, at one or both ends thereof, for appropriate connection to other components of the turbomachine, such as a turbine wheel, compressor wheel, or other suitable shaft drive means or shaft load. Examples of such turbomachines includes turbochargers, turbocompressors, gas turbine engines, air turbine starter motors, and the like.

In general terms, it is highly desirable to minimize and eliminate oil leakage along the rotating shaft and through the end wall of the bearing housing. Alternately stated, it is desirable to confine circulatory oil flow to the interior of the bearing housing. In this regard, a wide variety of oil seal configurations have been proposed in efforts to overcome oil leakage problems. However, the high speed shaft rotation and other operating conditions in a typical turbomachine environment have generally precluded complete elimination of the oil leakage. That is, high speed shaft rotation tends to result in relatively rapid wear of seal structures and early onset of oil leakage. This problem is compounded by high temperature operating environments and adverse differential pressures which may be present on opposite sides of the bearing housing end wall.

There exists, therefore, a continuing need for further improvements in oil seal structures for use in turbomachines and the like, for substantially eliminating oil leakage through the end wall of a bearing housing, notwithstanding high speed shaft rotation and high temperature operating conditions. The present invention fulfills these needs and provides further related advantages.

SUMMARY OF THE INVENTION

In accordance with the invention, an improved oil seal is provided for substantially eliminating oil leakage along a rotatable shaft extending through a shaft passage formed in an end wall of a bearing housing in a turbomachine or the like. The improved oil seal includes a slinger rotor mounted within the bearing housing, at the inboard side of the end wall, in combination with dynamic air-oil separators for centrifugal pumping of oil away from the shaft passage.

The slinger rotor is mounted onto the rotatable shaft as by press-fitting or the like for rotation therewith. The slinger rotor includes a radially outwardly extending slinger ring with a circumferential array of radially open slinger ports formed therein. A centrifuge sleeve projects axially from the slinger ring in a direction toward the adjacent end wall of the bearing housing. The centrifuge sleeve has an internal centrifuge surface disposed in close running clearance with an axially projecting cylindrical wall segment on the end wall, wherein this centrifuge surface is tapered with increasing diametric size in a direction toward the slinger ring. During shaft rotation, oil and air in the space between the centrifuge sleeve and the cylindrical end wall segment is pumped by centrifugal action in a direction away from the end wall, to the slinger ports for radial discharge to the interior of the bearing housing.

In accordance with a further aspect of a preferred form of the invention, the slinger rotor defines an internal bore with axially extending lands sized for press-fit mounting onto the rotatable shaft. The lands are separated by ramped slots which define additional centrifuge surfaces with a diametric size increasing in a direction away from the end wall. During shaft rotation, oil and air within these ramped slots is pumped by centrifugal action in a direction away from the end wall. An axial end face on the slinger rotor, opposite the end wall of the bearing housing, includes radially open notches which function as slinger ports to discharge the pumped oil to the interior of the bearing housing.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a fragmented vertical sectional view of a portion of a turbomachine, illustrating an improved oil seal to include a slinger rotor constructed in accordance with the novel features of the invention;

FIG. 2 is an inboard side elevation view of the slinger rotor shown in FIG. 1, with portions broken away to illustrate construction details thereof; and FIG. 3 is a vertical sectional view taken generally on the line 3—3 of FIG. 2.

DETAILED DESCRIPTION OF THE PREFERRED EMBODIMENT

As shown in the exemplary drawings, an improved oil seal arrangement is provided for use in a turbomachine or the like identified generally in FIG. 1 by the reference numeral 10. The oil seal includes a slinger rotor 12, for sealing passage of a rotatable shaft 14 through an end wall 16 of a bearing housing for the turbomachine. The slinger rotor 12 is mounted on the shaft 14 for rotation therewith, and includes one or more dynamic air-oil separators for preventing oil from reaching a shaft passage 18 formed in the housing end wall 16.

FIG. 1 generally shows the rotatable shaft 14 extending through the shaft passage 18 in the end wall 16 of the bearing housing, in a typical turbomachine application. In this regard, the end wall 16 cooperates with other elements of the bearing housing to define a substantially enclosed but typically vented space or volume 22 within which the shaft 14 is rotatably supported by appropriate journal and/or thrust bearings 24. An oil circulation system delivers lubricating oil along a flow path 26 to lubricate the bearings 24, wherein the oil flows through the bearings for drainage to a sump 28 within a lower region of the bearing housing. The slinger rotor 12 is mounted on the shaft 14 at the inboard side of the end wall 16, and functions to prevent any oil from reaching the shaft passage 18, thereby substantially eliminating undesired oil leakage. Although the slinger rotor 12 is shown at one end of the bearing housing for purposes of illustrating the invention, it will be understood that a similar oil seal arrangement may be provided in association with another shaft passage at an opposite end of the bearing housing. In this regard, the shaft 14 projects from the bearing housing for appropriate connection to other components of the turbomachine, such as a compressor wheel, turbine wheel, or other drive means or driven load.

To accommodate the seal arrangement of the present invention, as shown in FIG. 1, the end wall 16 of the bearing housing is shaped to define an annular channel 30 which opens in an inboard direction to the interior 22 of the bearing housing. The channel 30 is defined by an axially projecting cylindrical wall segment 32 which lines the shaft passage 18, and is disposed concentrically within an outer wall segment 34. The inner and outer wall segments 32, 34 are formed coaxially with a rotational axis 36 of the shaft 14.

The slinger rotor 12 has a generally cylindrical configuration with a size and shape for mounting as by press-fit installation onto the rotatable shaft 14. The slinger rotor 12 has an inboard axial end face 38 positioned adjacent to, and preferably abutted with an outboard bearing 24 which rotatably supports the shaft 14. An outboard end segment 40 of the slinger rotor 12 is formed with a relatively narrow radial dimension to fit with close running clearance within the inner wall segment 32 of the end wall 16.

A slinger ring 42 is formed on the slinger rotor 12 to extend radially outwardly within the housing interior 22, at a position proximate to the inboard face of the end wall 16. The slinger ring 42 has a circumferentially arranged plurality of radially open slinger ports 44 formed therein. Accordingly, during shaft rotation in the course of turbomachine operation, the slinger ring 42 and associated ports 44 function by centrifugal action to pump oil in a radially outward direction away from the shaft passage 18.

A centrifuge sleeve 46 is also provided as part of the slinger rotor 12 to project axially from the slinger ring 42 in a direction toward the end wall 16, to fit within the end wall channel 30. As shown, the centrifuge sleeve has an inner tapered centrifuge surface 48 positioned in relatively close running clearance with an outer cylindrical surface of the inner wall segment 32. The centrifuge surface 48 is tapered from a relatively small diametric size at the outboard end thereof to a larger diametric size at the radially inner extent of the slinger ports 44. In this regard, the slinger ports 44 are in open flow communication with the maximum diameter portion of the centrifuge surface 48.

In operation, during shaft rotation at typically high speed, any oil and air within the space between the centrifuge sleeve 46 and the inner wall segment 32 is driven or pumped toward the slinger ports 44. In effect, heavier oil is driven by centrifugal action against the centrifuge surface 48 and then axially away from the end wall 16 to the slinger ports 44. As noted previously, oil within the slinger ports 44 is centrifugally pumped for radially outward discharge into the interior 22 of the bearing housing 16, to drain ultimately to the sump 28.

The above-described centrifugal pumping action is desirably enhanced by surface finish characteristics of the centrifuge surface 48, and the surface extending radically outward therefrom between the slinger rotor 12 and endwall 16, in comparison with the surface finish on the inner wall segment 32. More particularly, the pumping action is substantially improved by forming the centrifuge surface 48 to be significantly rougher than the surface finish of the outer diameter side of the wall segment 32. With this comparatively rougher surface, the rotating centrifuge sleeve 46 tends to accelerate oil and air between the sleeve 46 and the adjacent wall segment 32 to a rotational speed substantially corresponding to shaft speed. The thus-accelerated oil and air is then subject to the dynamic air-oil separation, as previously described, with collected oil being ultimately discharged through the slinger ports 44 to the housing interior. Although the comparative surface finishes on the components may vary, a preferred ratio of surface finishes is on the order of about 4:1 or 5:1.

In accordance with further aspects of the invention, an additional dynamic air-oil separator is desirably provided within the internal bore of the slinger rotor 12. More specifically, as shown in FIGS. 2 and 3, the rotor bore is defined by a plurality of axially extending lands 50 formed on a radius for mounting as by press-fit installation onto the shaft 14. These lands 50 are separated from one another by axially extending ramped slots 54 which define additional centrifuge surfaces tapering with increasing diametric size in a direction away from the end wall 12. At the inboard end face 38 of the slinger rotor 12, the ramped slots 54 communicate with radially outwardly open notches 58 formed in said end face 38.

In operation, any oil and air within the ramped slots 54 of the slinger rotor bore is also centrifugally accelerated for depositing the oil within said slots onto the tapered centrifuge surfaces at the outermost radial extent of the slots 54. The tapered geometry of these centrifuge surfaces results in centrifugal pumping of the oil toward the inboard end face 38 of the slinger rotor, to the radially open notches 58. These notches 58 act in a manner similar to the slinger ports 44 for radially pumping and discharging the collected oil to the interior 22 of the bearing housing.

The improved slinger rotor 12 of the present invention thus provides at least one and preferably multiple dynamic air-oil separator structures for centrifugal pumping of oil, so as to keep the oil away from the shaft passage 18 in the end wall 16 of the bearing housing. Importantly, this centrifugal pumping action effectively eliminates oil leakage through the shaft passage, without requiring any substantial or direct running mechanical contact between rotating and stationary components. The improved seal structure is thus capable of preventing oil leakage over a prolonged operating life, at high shaft speeds, and in response to high temperature operating environments.

A variety of further modifications and improvements to the invention described herein will be apparent to those skilled in the art. Accordingly, no limitation on the invention is intended by way of the foregoing description and accompanying drawings, except as set forth in the appended claims.

What is claimed is:

1. An oil seal for sealing passage of a rotatable shaft through a shaft passage formed in an end wall of a bearing housing, said oil seal comprising:

a generally cylindrical wall segment formed on the end wall in a position lining the shaft passage and projecting from the end wall in an axial inboard direction into the bearing housing said cylindrical wall segment having an inner wall segment on the end wall that cooperates with an outer generally cylindrical wall segment on the end wall to define an annular channel; and a slinger rotor mounted on said shaft for rotation therewith, said slinger rotor including a slinger ring with a plurality of radially open slinger ports formed therein;

said slinger rotor further including a centrifuge sleeve extending axially from said slinger ring in an outboard direction and projecting axially into said annular channel, said centrifuge sleeve defining an internal centrifuge surface disposed in relatively close running clearance with said cylindrical wall segment and having a diametric size which tapers with increasing diameter in an inboard direction, said centrifuge surface having an inboard end in flow communication with radially inner ends of said slinger ports, whereby oil within the space between said centrifuge sleeve and said cylindrical wall segment is pumped by centrifuge action during shaft rotation along said centrifuge surface in a direction away from the end wall to said slinger ports.

2. The oil seal of claim 1 wherein said slinger rotor has a bore formed therein for press-fit mounting of said slinger rotor onto the shaft.

3. The oil seal of claim 1 wherein said centrifuge surface of said slinger rotor has a surface finish which is comparatively rougher than a surface finish of said cylindrical wall segment.

4. The oil seal of claim 1 wherein said slinger rotor has a bore formed therein and defined by a plurality of axially extending lands separated from each other by axially extending ramped slots having a diametric size which tapers with increasing diameter in an inboard direction, said lands being sized for press-fit mounting of said slinger rotor onto the shaft, and said ramped slots being for pumping oil within the space between adjacent lands by centrifuge action during shaft rotation in a direction away from the end wall.

5. The oil seal of claim 4 wherein said slinger rotor defines an inboard end having a plurality of radially open notches formed therein and positioned respectively in flow communication with said ramped slots.

6. An oil seal for sealing passage of a rotatable shaft through a shaft passage formed in an end wall of a bearing housing, said oil seal comprising:

a generally cylindrical wall segment formed on the end wall in a position lining the shaft passage and projecting from the end wall in an axial inboard direction into the bearing housing said cylindrical wall segment having an inner wall segment on the end wall that cooperates with an outer generally cylindrical wall segment on the end wall to define an annular channel; and a slinger rotor mounted on said shaft for rotation therewith, said slinger rotor including a slinger ring with a plurality of radially open slinger ports formed therein;

said slinger rotor further including a centrifuge sleeve extending axially from said slinger ring in an outboard direction and projecting axially into said annular channel, said centrifuge sleeve defining an internal centrifuge surface disposed in relatively close running clearance with said cylindrical wall segment and having a diametric size which tapers with increasing diameter in an inboard direction, said centrifuge surface having an inboard end in flow communication with radially inner ends of said slinger ports, whereby oil within the space between said centrifuge sleeve and said cylindrical wall segment is pumped by centrifuge action during shaft rotation along said centrifuge surface in a direction away from the end wall to said slinger ports;

said slinger rotor having a bore formed therein and defined by a plurality of axially extending lands separated from each other by axially extending ramped slots having a diametric size which tapers with increasing diameter in an inboard direction, said lands being sized for press-fit mounting of said slinger rotor onto the shaft, and said ramped slots being for pumping oil within the space between adjacent lands by centrifuge action during shaft rotation in a direction away from the end wall.

7. The oil seal of claim 6 wherein said slinger rotor defines an inboard end having a plurality of radially open notches formed therein and positioned respectively in flow communication with said ramped slots.

8. The oil seal of claim 6 wherein said centrifuge surface of said slinger rotor has a surface finish which is comparatively rougher than a surface finish of said cylindrical wall segment.

9. An oil seal for sealing passage of a rotatable shaft through a shaft passage formed in an end wall of a bearing housing, said oil seal comprising:

a generally cylindrical wall segment formed on the end wall in a position lining the shaft passage and projecting from the end wall in an axial inboard direction into the bearing housing; and a slinger rotor mounted on said shaft for rotation therewith, said slinger rotor having a bore formed therein and defined by a plurality of axially extending lands separated from each other by axially extending ramped slots having a diametric size which tapers with increasing diameter in an inboard direction, said lands being sized for press-fit mounting of said slinger rotor onto the shaft, and said ramped slots being for pumping oil within the space between adjacent lands by centrifuge action during shaft rotation in a direction away from the end wall;

said slinger rotor defining an inboard end having a plurality of radially open notches formed therein and positioned respectively in flow communication with said ramped slots.

* * * * *